(12) United States Patent
Yin et al.

(10) Patent No.: US 11,089,255 B2
(45) Date of Patent: Aug. 10, 2021

(54) FINGERPRINT RECOGNITION SYSTEM AND IDENTIFICATION METHOD THEREOF

(71) Applicant: Guangzhou Tyrafos Semiconductor Technologies Co., Ltd., Guangzhou (CN)

(72) Inventors: Ping-Hung Yin, Taipei (TW); Jia-Shyang Wang, Miaoli County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 17/101,166

(22) Filed: Nov. 23, 2020

(65) Prior Publication Data

US 2021/0174056 A1 Jun. 10, 2021

Related U.S. Application Data

(60) Provisional application No. 62/945,250, filed on Dec. 9, 2019.

(51) Int. Cl.
*G06K 9/00* (2006.01)
*H04N 5/378* (2011.01)
*H04N 5/3745* (2011.01)

(52) U.S. Cl.
CPC ........... *H04N 5/378* (2013.01); *G06K 9/0004* (2013.01); *G06K 9/0012* (2013.01); *G06K 9/00033* (2013.01); *G06K 9/00046* (2013.01); *G06K 9/00087* (2013.01); *G06K 9/00919* (2013.01); *H04N 5/37455* (2013.01)

(58) Field of Classification Search
CPC .............. H04N 5/378; H04N 5/37455; G06K 9/00087; G06K 9/0012; G06K 9/00919; G06K 9/00033; G06K 9/0004; G06K 9/00046
See application file for complete search history.

(56) References Cited

U.S. PATENT DOCUMENTS

| | | | |
|---|---|---|---|
| 2006/0120576 A1* | 6/2006 | Chen ................... | G06K 9/2036 382/124 |
| 2008/0219522 A1* | 9/2008 | Hook .................. | G06K 9/0012 382/124 |
| 2008/0253620 A1* | 10/2008 | Hashimoto ........ | G06K 9/00033 382/115 |

(Continued)

*Primary Examiner* — Abhishek Sarma
(74) *Attorney, Agent, or Firm* — Lin & Associates Intellectual Property, Inc.

(57) ABSTRACT

The invention relates to a fingerprint recognition system. The fingerprint recognition system includes a light emitter, an optical receiver, and a comparison module. First, the light emitter emits at least one patterned emitted light to an object to be measured, and the patterned reflected light reflected by the object is received by the light receiver. Then, the patterned emitted light and the patterned reflected light are compared with each other and the comparison information is generated by the comparison module. Finally, when the comparison information is in the three-dimensional comparison interval, the surface of the object to be measured is determined to be three-dimensional; otherwise, the surface of the object to be measured is determined to be flat. Therefore, the fingerprint recognition system of the present invention can achieve the purposes of real-time differentiation and wide applicability.

22 Claims, 18 Drawing Sheets

(56) References Cited

U.S. PATENT DOCUMENTS

| | | | |
|---|---|---|---|
| 2015/0227773 A1* | 8/2015 | Miesak | G06K 9/00013 |
| | | | 382/124 |
| 2015/0324566 A1* | 11/2015 | Miura | G06K 9/00067 |
| | | | 726/19 |
| 2017/0024603 A1* | 1/2017 | Misslin | G06K 9/00604 |
| 2018/0068100 A1* | 3/2018 | Seo | G06K 9/00892 |
| 2019/0310724 A1* | 10/2019 | Yeke Yazdandoost | |
| | | | H01L 27/3211 |

* cited by examiner

FINGERPRINT RECOGNITION SYSTEM AND IDENTIFICATION METHOD THEREOF

CROSS-REFERENCE TO RELATED APPLICATION

This application claims the priority of U.S. provisional application No. 62/945,250, filed on Dec. 9, 2019, which is incorporated herewith by reference.

BACKGROUND OF THE INVENTION

1. Field of the Invention

The present invention relates generally to a recognition system, and more particularly, to a fingerprint recognition system and identification method thereof.

2. The Prior Arts

The rapid development of fingerprint recognition technology has made the fingerprint recognition a standard feature of most smart phones. The advantage of fingerprint recognition is that the fingerprint is unique, and the complexity of the fingerprint is sufficient for identification. In addition, when the additional reliability is necessary, it only needs to register more fingerprints to identify more fingers, up to ten, and each fingerprint is unique. Furthermore, scanning fingerprints nowadays is fast and easy to use, which is also one of the main reasons that fingerprint recognition technology has such a huge market share.

However, fingerprint recognition is not absolutely secure. People leave their fingerprints in many public places every day. Someone else with malicious intention can easily obtain a copy of fingerprint. Once fingerprints are restored, personal devices and information security may be stolen. Also, compared to password, the password can still be reset even after being cracked, but the fingerprint cannot be reset. Therefore, how to improve the security and recognition ability of fingerprint recognition is one of the problems that must be solved.

Therefore, after observing the above-mentioned deficiencies, the inventors of the present case proposed the present invention.

SUMMARY OF THE INVENTION

A primary objective of the present invention is to provide a fingerprint recognition system, which can compare at least one patterned emitted light and at least one patterned reflected light with each other through a comparison module, so as to determine whether the surface of the object under test is three-dimensional, which effectively prevents others from cracking the fingerprint recognition system with fingerprint images or pictures, and greatly increases the security and identification capabilities of the fingerprint recognition system.

In order to achieve the above objective, the present invention provides a fingerprint recognition system, applicable to fingerprint identification. The fingerprint recognition system includes: at least one light emitter, emitting at least one patterned emitted light onto at least an object under test in a recognition area; at least one light receiver, electrically connected to the light emitter, for receiving at least one patterned reflected light reflected by the object under test, wherein an incident angle existing between the object under test and the patterned emitted light and a plurality of reflection angles existing between the object under test and the patterned reflected light, and the incident angle and the reflection angle being all between 0 degrees and 90 degrees; and a comparison module, electrically connected to the light emitter and the light receiver, for comparing the at least one patterned emitted light and the at least one patterned reflected light with each other, and generating a comparison information; wherein, when the comparison information is in a three-dimensional comparison interval, the comparison module determining that the object under test having a three-dimensional surface; otherwise, the comparison module determining that the object under test having a planar surface; the three-dimensional comparison interval being used as a reference value for judging whether the surface of the object under test is three-dimensional, and the patterned emitted light being selected from one or a combination of moving, rotating, zooming in, zooming out, flickering, and non-flickering modes.

Preferably, according to the fingerprint recognition system of the present invention, the at least one patterned emitted light is one or a combination of a point emitted light, a stripe emitted light, a grid emitted light, a closed curve emitted light, an open curve emitted light and irregular light.

Preferably, according to the fingerprint recognition system of the present invention, the recognition area is perpendicular to the light emitter and the light receiver at different times.

Preferably, the fingerprint recognition system according to the present invention includes a plurality of light emitters, and at least two of the light emitters respectively emit at least one patterned emitted light to the object under test for the different incident angles of the patterned emitted lights.

Preferably, the fingerprint recognition system according to the present invention includes a plurality of light receivers, and at least two of the light receivers respectively receive the patterned reflected light for different reflection angles of the patterned reflected lights.

Preferably, according to the fingerprint recognition system of the present invention, the at least one patterned emitted light has a pattern close to the spatial frequency of the fingerprint.

Preferably, according to the fingerprint recognition system of the present invention, the at least one patterned emitted light has a pattern smaller than the spatial frequency of the fingerprint.

Preferably, according to the fingerprint recognition system of the present invention, the wavelength of the at least one patterned emitted light is not a fixed value.

Preferably, according to the fingerprint recognition system of the present invention, the light emitter emits the patterned emitted light at an emission frequency that is not a fixed value.

Preferably, according to the fingerprint recognition system of the present invention, the light emitter can use a laser beam or an LED beam as the emitted light, so the wavelength of the at least one patterned emitted light emitted by the light emitter is between 360 nm and 1550 nm. For example, the wavelength of the at least one patterned emitted light may be 495 nm, 650 nm, 850 nm, 940 nm, 1300 nm, 1310 nm, 1350 nm, and so on.

Preferably, according to the fingerprint recognition system of the present invention, the reflection angle is not 0 degrees.

Preferably, the fingerprint recognition system according to the present invention further includes an actuator, movably coupled to the light emitter, and the actuator changes the incident angle of the at least one patterned emitted light.

Preferably, according to the fingerprint recognition system of the present invention, the recognition area further includes a prompt symbol, the prompt symbol is electrically connected to the fingerprint recognition system, and the prompt symbol is used to indicate the position for the object under test to press on.

Preferably, according to the fingerprint recognition system of the present invention, the shape of the recognition area includes a protrusion, and the protrusion is used to make at least a part of an edge of the object under test inside the recognition area.

Preferably, according to the fingerprint recognition system of the present invention, the prompt symbol is arranged near the edge of the recognition area.

In addition, to achieve the aforementioned objective, based on the aforementioned fingerprint recognition system, the present invention further provides an identification method for executing the aforementioned fingerprint recognition system, which includes: an emission step: the at least one light emitter emitting the at least one patterned emitted light to the object under test in the recognition area; a receiving step: the at least one light receiver receiving the at least one patterned reflected light reflected by the object under test in the recognition area; a comparison step: the comparison module comparing the at least one patterned emitted light and the at least one patterned reflected light are compared with each other, and generating comparison information; and an identification step: if the comparison information being in the three-dimensional comparison interval, the surface of the object under test being three-dimensional; otherwise, the surface of the object under test being planar.

Preferably, the identification method according to the present invention further includes a confirmation step: after the identification step is performed, if the fingerprint recognition system determines that the object under test has a planar surface, another light emitter emits at least one patterned emitted light to the object under with a different incident angles of the patterned emitted light, and then the steps of emission, receiving, comparison, and identification are repeated.

Preferably, the identification method according to the present invention further includes a confirmation step: after the identification step is performed, if the fingerprint recognition system determines that the object under test has a planar surface, another light receiver receives the patterned reflected light reflected by the object under test with a different reflection angle for receiving the patterned reflected light, and then the steps of emission, receiving, comparison, and identification are repeated.

Preferably, the identification method according to the present invention further includes a confirmation step: after the identification step is performed, if the fingerprint recognition system determines that the object under test has a planar surface, the light emitter emits another patterned emitted light to the object under test with a different or a combination mode of moving, rotating, zooming in, zooming out, flickering, and non-flickering modes, and then the steps of emission, receiving, comparison, and identification are repeated.

Preferably, according to the identification method of the present invention, the identification step further includes: a three-dimensional identification step: the light comparison module identifying the object under test having a three-dimensional surface if the comparison information being in the three-dimensional comparison interval; otherwise, the comparison module determining that the surface of the object under test being planar; and, a fingerprint identity recognition step: using a pattern having high spatial frequency of the patterned reflected light to perform fingerprint recognition on the object under test.

In summary, the fingerprint recognition system and identification method provided by the present invention mainly use the fingerprint recognition system of the present invention and associated method to determine whether the object under test is three-dimensional. As such, the present invention can effectively prevent others from using photos or images of fingerprints to crack the fingerprint recognition system and greatly increase the security and recognition capabilities of the fingerprint recognition system.

To enable those skilled in the art to understand the purpose, features, and effects of the present invention, the following specific embodiments and accompanying drawings are used to describe the present invention in detail as follows.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
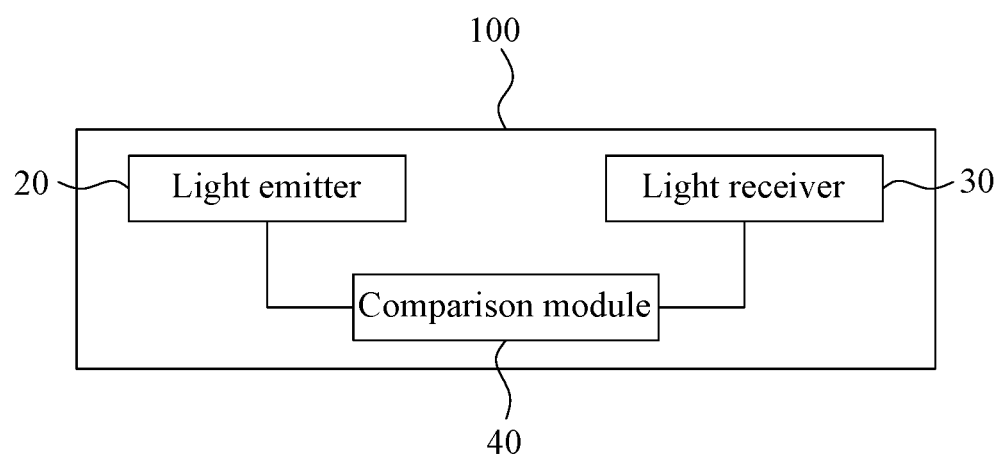
FIG. 1 is a schematic view of a fingerprint recognition system according to a first embodiment of the present invention.

Referring to FIG. 1, FIG. 1 is a schematic view of a fingerprint recognition system according to a first embodiment of the present invention. As shown in FIG. 1, the fingerprint recognition system 100 according to the present invention includes: alight emitter 20, a light receiver 30 and a comparison module 40.

Specifically, the light emitter 20 according to the present invention emits a patterned emitted light r to an object 200 under test (or test object) in a recognition area 300. It should be further noted that the light emitter can use a laser beam or an LED beam as the patterned emitted light r, so the wavelength of the patterned emitted light r emitted by the light emitter 20 can be between 360 nm and 1550 nm; for example, the patterned emitted light r may be 495 nm, 650 nm, 850 nm, 940 nm, 1300 nm, 1310 nm, 1350 nm, and so on, but the present invention is not limited thereto.

Specifically, the fingerprint recognition system 100 according to the present invention can be applied to a smart phone, so the screen of the smart phone can be used as the light emitter 20 without the need for an additional light emitter 20 to increase the applicability. The light emitter 20 may be a light emitting diode (LED), an organic light emitting diode (OLED), a quantum dot light emitting diode (QLED), and so on, but the present invention is not limited thereto.

Specifically, the patterned emitted light r emitted by the light emitter 20 may be selected from one or a combination of moving, rotating, zooming in, zooming out, flickering, and non-flickering modes, but the present invention is not limited to this.

Specifically, the patterned emitted light r emitted by the light emitter 20 may be one or a combination of a point emitted light, a stripe emitted light, a grid line emitted light, a closed curve emitted light, an open curve emitted light, and an irregular pattern emitted light, but the present invention is not limited thereto.

Specifically, in the present embodiment, the patterned emitted light r may have a pattern close to the spatial frequency of a real fingerprint. As a result, when the fingerprint recognition system 100 of the present invention is used for fingerprint recognition, it will be easier to determine whether the surface of the test object 200 is three-dimensional, but the present invention is not limited to thereto.

It should be further explained that the more the patterned emitted light r emitted by the light emitter 20 changes, the more variables and data volume the fingerprint recognition system 100 of the present invention will generate, thereby improving the processing accuracy of judging whether the surface of the test object 200 is three-dimensional or not. Therefore, the effect is better in terms of the identification ability of fingerprint recognition. However, because the implementation is more complicated, the characteristics and the costs of the product applicable to the fingerprint recognition system 100 can be taken into consideration when selecting a specific implementation.

Figure 2:
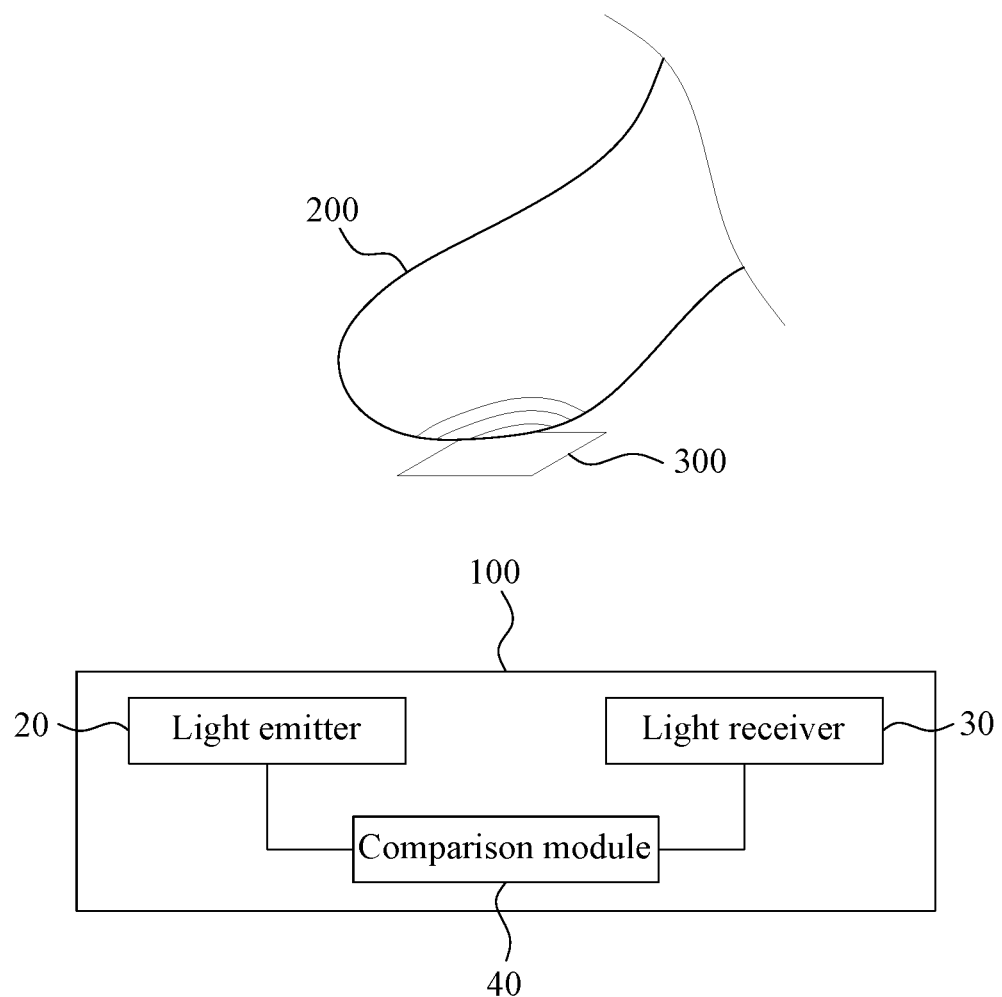
FIG. 2 is a schematic view of the disposition location of the fingerprint recognition system according to the first embodiment of the present invention.

Referring to FIG. 2, FIG. 2 is a schematic view of the disposition location of the fingerprint recognition system according to the first embodiment of the present invention. As shown in FIG. 2, the light receiver 30 receives the patterned reflected light r' reflected by the test object 200 in the recognition area 300. It should be further explained that there exists an incident angle θ between the test object 200 in the recognition area 300 and the patterned emitted light r, and there exists a reflection angle θ' between the test object 200 in the recognition area 300 and the patterned reflected light r', wherein the incident angle θ and the reflection angle θ' are both between 0 degrees and 90 degrees.

Specifically, the comparison module 40 of the present invention is electrically connected to the light emitter 20 and the light receiver 30, and the comparison module 40 compares the patterned emitted light r with the patterned reflected light r', and generates comparison information (not shown). When the comparison information is in the three-dimensional comparison interval (not shown), the comparison module 40 determines that the surface of the test object 200 is three-dimensional; otherwise, the comparison module 40 determines that the surface of the test object 200 is a flat surface; wherein, the comparison module 40 can be a computer, a server, a smart phone, or an integrated circuit, and so on, but the present invention is not limited thereto.

Figure 3:
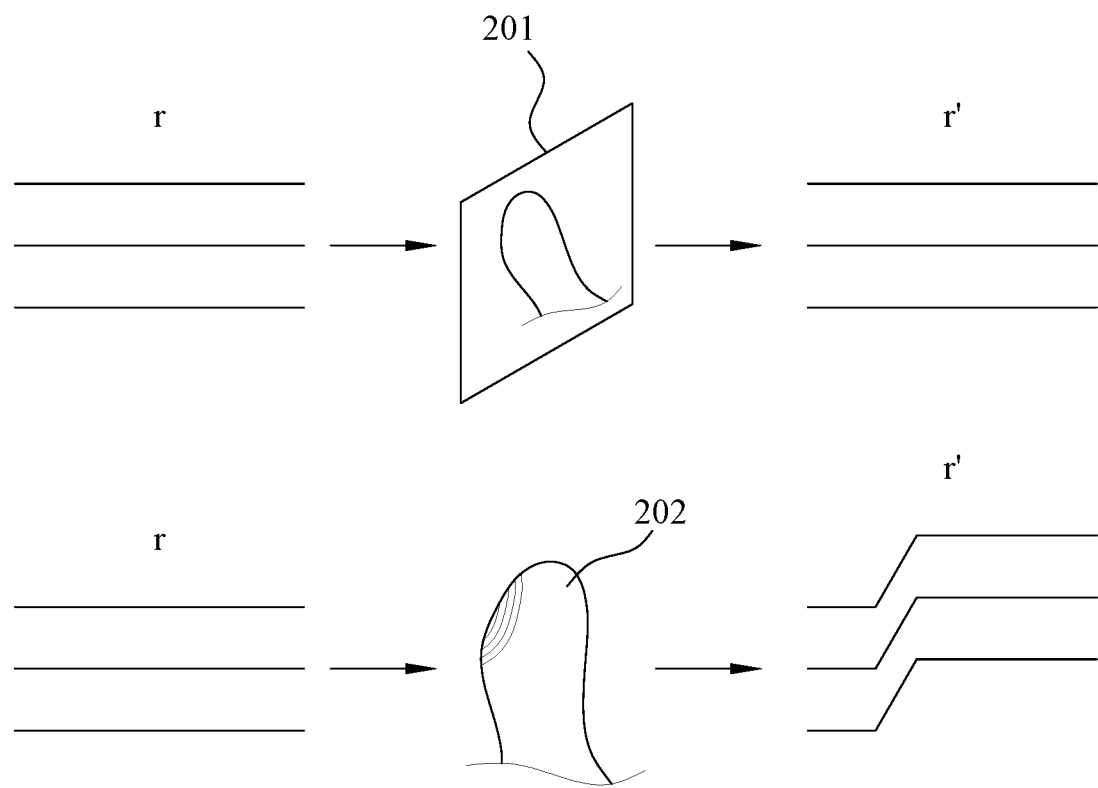
FIG. 3 is a schematic view of recognition of the fingerprint recognition system according to the first embodiment of the present invention.

Furthermore, referring to FIG. 3, FIG. 3 is a schematic view of recognition of the fingerprint recognition system according to the first embodiment of the present invention. As shown in FIG. 3, in the present embodiment, the fingerprint recognition system 100 is applied to recognizing fingerprints. When the test object 200 is a real finger, because the finger is three-dimensional and the surface is an uneven surface, the comparison between the patterned emitted light r and the patterned reflected light r' will show pattern deformation, so that the surface of the test object 200 can be clearly determined as three-dimensional. On the other hand, if the test object 200 is a picture or image of a fingerprint, because the pictures and images have flat surfaces, the comparison between the patterned emitted light r and the patterned reflected light r' will show no pattern deformation, so that the surface of the test object 200 can be determined to be flat, and the authenticity of the fingerprint can be determined. Wherein, the three-dimensional comparison interval is proportional to the amount of deformation, and the three-dimensional comparison interval can be determined by the system. As such, the fingerprint recognition system 100 of the present invention can effectively prevent others from cracking the fingerprint recognition system with fingerprint photos or pictures, and greatly increase the security and recognition ability of the fingerprint recognition system.

It is worth noting that, according to the fingerprint recognition system 100 of the present invention, it is only necessary to compare whether there is a deformation between the patterned emitted light r and the patterned reflected light r', without calculating the actual object 200 under test. The depth information between the fingerprint recognition system 100 and the fingerprint recognition system 100 can greatly reduce the time for the comparison module 40 to determine whether the surface of the object 200 is three-dimensional. In other words, the fingerprint recognition system 100 of the present invention can perform real-time recognition.

Specifically, the comparison module 40 of the present invention may further include a setting unit (not shown), the setting unit is used to set the three-dimensional comparison interval. The smaller the three-dimensional comparison interval is, the more strict the fingerprint recognition system 100 in determining whether the surface of the test object 200 is three-dimensional. Therefore, the security of the fingerprint recognition system 100 is increased. However, the fingerprint recognition system 100 uses a too small three-dimensional comparison interval may result in certain cases wherein the surface of the test object 200 cannot be accurately recognized as a three-dimensional, leading to decreased accuracy of the fingerprint recognition, thereby causing inconvenience to the user. On the other hand, when the three-dimensional comparison interval is larger, which allows more room for determining the surface of the test object 200 as three-dimensional, it may reduce the security of the fingerprint recognition system 100. The user can choose which three-dimensional comparison interval is more appropriate according to the application needs and product characteristics.

It is worth noting that in the present embodiment, the fingerprint recognition system 100 is applied to fingerprint recognition, and each component in the fingerprint recognition system 100 of the present invention is a necessary component in the fingerprint recognition system. Therefore, when the fingerprint recognition system 100 is applied to fingerprint recognition, no additional components are required. In other words, the fingerprint recognition system 100 of the present invention has the advantages of high applicability and low cost.

Figure 4:
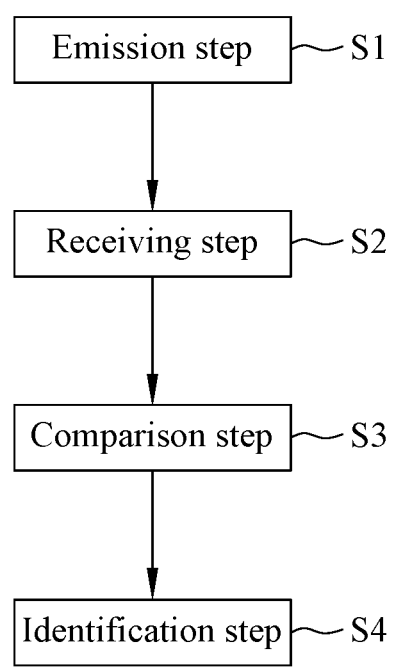
FIG. 4 is a flowchart illustrating the steps of identification method of the fingerprint recognition system according to the first embodiment of the present invention.

To provide a further understanding of the structural features of the present invention, the use of technical means and the expected effects, the use of the present invention are described as follows:

Referring to FIG. 4 as well as FIG. 2 and FIG. 3, FIG. 4 is a flowchart illustrating the steps of identification method of the fingerprint recognition system according to the first embodiment of the present invention. Based on the aforementioned fingerprint recognition system 100, the present invention provides an identification method of the fingerprint recognition system 100, comprising the following steps:

Emission step S1: the at least one light emitter 20 emitting the at least one patterned emitted light r to the object 200 under test; then proceed to receiving step S2.

Receiving step S2: the at least one light receiver 30 receiving the at least one patterned reflected light r' reflected by the object 200 under test; then proceed to comparison step S3.

Comparison step S3: the comparison module 40 comparing the at least one patterned emitted light r and the at least one patterned reflected light r', and generating comparison information; then proceed to identification step S4.

Identification step S4: if the comparison information being in the three-dimensional comparison interval, the comparison module 40 determining the surface of the object 200 under test being three-dimensional; otherwise, the comparison module 40 determining the surface of the object 200 under test being planar.

For example, referring to FIG. 3 as well as FIG. 2 and FIG. 4, in the emission step S1, the light emitter 20 respectively emits the patterned emitted light r respectively to the object 201 under test and the object 202 under test, wherein the light emitter 20 can use a laser beam or an LED beam as the patterned emitted light r. Then, in the receiving step S2, the light receiver 30 receives the patterned reflected light r' reflected by the object 201 and the object 202. In the comparison step S3, the comparison module 40 is used to compare the patterned emitted light r with the patterned reflected lights r' to generate the comparison information; and finally, in the identification step S4, the object 201 and the object 202 are identified by the comparison module 40. When the comparison information is in the three-dimensional comparison interval, the comparison module 40 determines that the surface of the object is three-dimensional; otherwise, the comparison module 40 determines that the surface of the object is a flat surface.

Specifically, as shown in FIG. 3, the fingerprint recognition system 100 of the present embodiment is applied to fingerprint recognition, and the test object 201 is a picture or image of a finger while the test object 202 is an actual finger of the user. Therefore, the patterned reflected light r' generated by the patterned emitted light r emitted to the test object 201 will not be deformed. When the comparison module 40 comparing the two, the comparison module 40 determines that the surface of the test object 201 is planar, that is, the test object 201 is not a true fingerprint. Furthermore, since the object 202 is three-dimensional and the surface is an uneven surface, the comparison between the patterned emitted light r and the patterned reflected light r' by the comparison module 40 shows the pattern deformation, thus it can be clearly determined that the surface of the object 202 is three-dimensional; that is, the user can successfully unlock the fingerprint recognition system.

It should be further explained that in some special cases, for example, the incident direction of the patterned emitted light r and the three-dimensional portion of the object 200 are parallel to each other, so that there is no obvious pattern deformation when comparing the patterned emitted light r and the patterned reflected light r'. Therefore, the comparison module 40 may judge the surface of the three-dimensional object 200 as a flat surface, which prevents unlocking the fingerprint recognition system. Or, the setting unit may set three-dimensional comparison interval too small, so that the user cannot unlock the fingerprint recognition system, causing inconvenience to the user. Therefore, in the present embodiment, the recognition area 300 is arranged to be not perpendicular to the light emitter 20 and the light receiver 30 at the same time, but the present invention is not limited to thereto.

Figure 5:
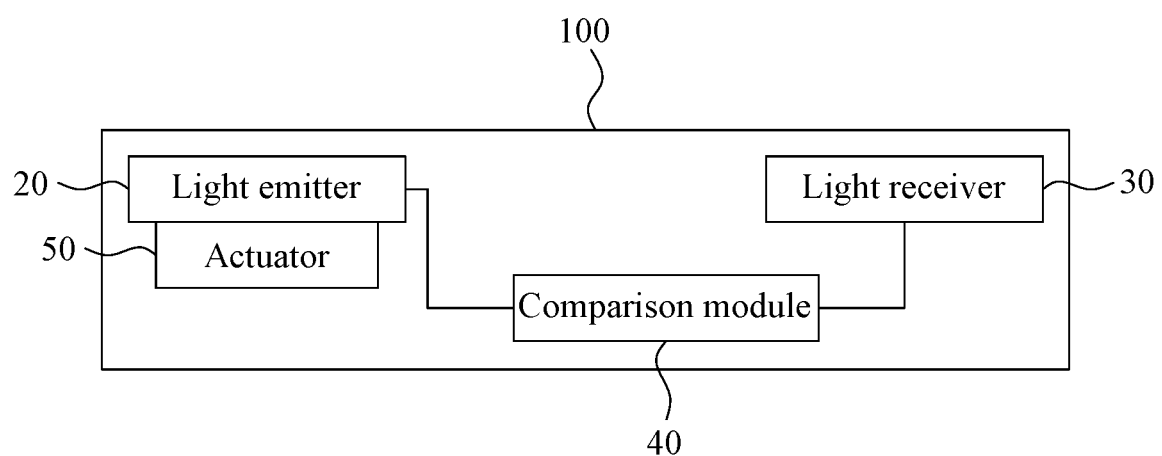
FIG. 5 is a schematic view of the architecture of the fingerprint recognition system according to a second embodiment of the present invention.
Figure 6:
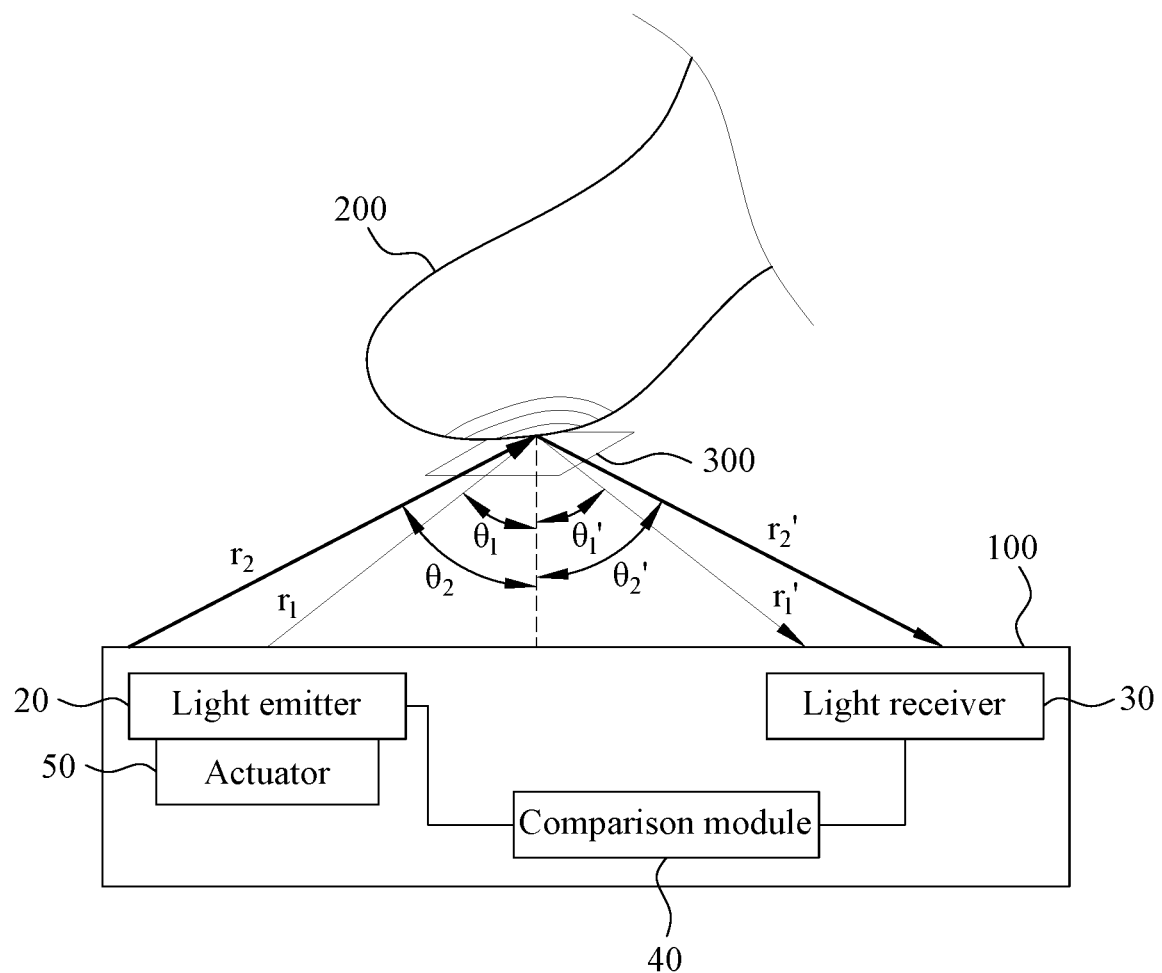
FIG. 6 is a schematic view of the disposition location of the fingerprint recognition system according to the second embodiment of the present invention.

Referring to FIG. 5 and FIG. 6, FIG. 5 is a schematic view of the architecture of the fingerprint recognition system according to a second embodiment of the present invention; FIG. 6 is a schematic view of the disposition location of the fingerprint recognition system according to the second embodiment of the present invention. Compared with the first embodiment, the main structural difference of the second embodiment is that the fingerprint recognition system 100 further includes an actuator 50, which is movably coupled to the light transmitter 20. The actuator 50, through moving, can change the patterned emitted light r1 emitted by the light emitter 20 to the patterned emitted light r2, so as to cause the incident angle to change from θ1 to θ2, and the reflection angle from θ1' to θ2'.

As such, the second embodiment not only achieves the effects of the first embodiment, but also effectively solves the aforementioned problems in some special cases through the disposition of the actuator 50. When the incident direction of the patterned emitted light r1 and the three-dimensional portion of the object 200 are parallel to each other, there is no obvious pattern deformation between the patterned emitted light r1 and the patterned reflected light r1', so that the comparison module 40 may erroneously determine that the three-dimensional test object 200 has a flat surface, and thus cannot unlock the fingerprint recognition system, causing inconvenience to the user.

Specifically, the patterned emitted light r emitted by the light emitter 20 may be selected from one or a combination of moving, rotating, zooming in, zooming out, flickering, and non-flickering modes, but the present invention is not limited to this.

Specifically, the patterned emitted light r emitted by the light emitter 20 may be one or a combination of a point emitted light, a stripe emitted light, a grid line emitted light, a closed curve emitted light, an open curve emitted light, and an irregular pattern emitted light, but the present invention is not limited thereto.

Specifically, in the present embodiment, the patterned emitted light r may have a pattern close to the spatial frequency of a real fingerprint. As a result, when the fingerprint recognition system 100 of the present invention is used for fingerprint recognition, it will be easier to determine whether the surface of the test object 200 is three-dimensional, but the present invention is not limited to thereto.

Figure 7:
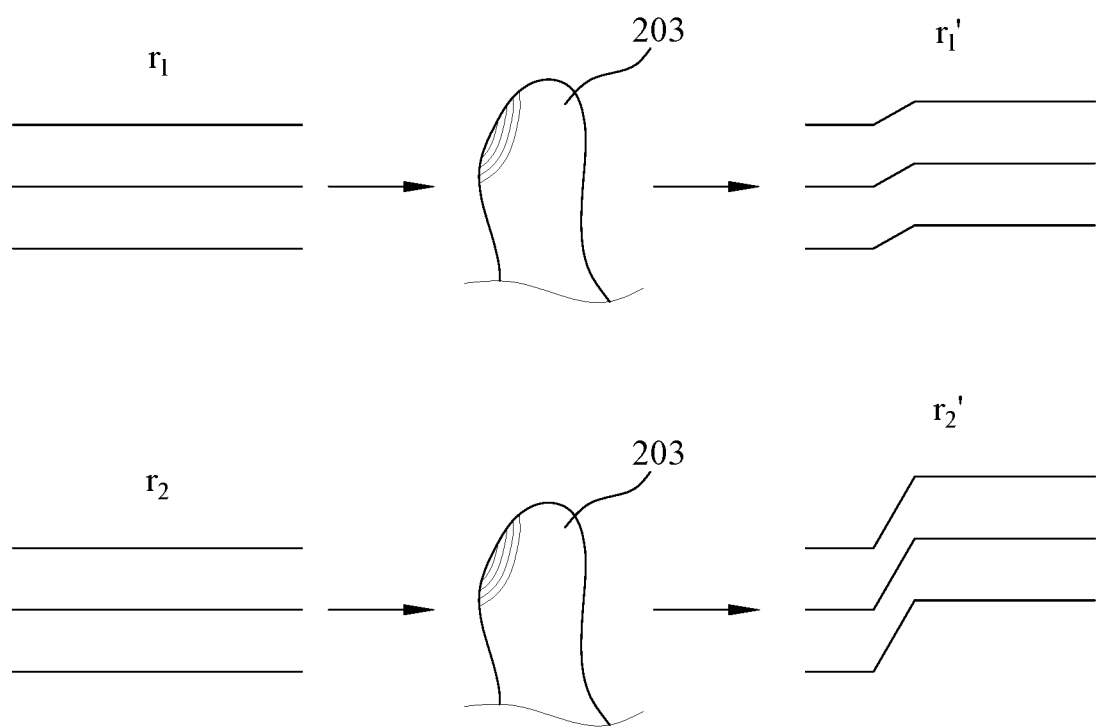
FIG. 7 is a schematic view of recognition of the fingerprint recognition system according to the second embodiment of the present invention.
Figure 8:
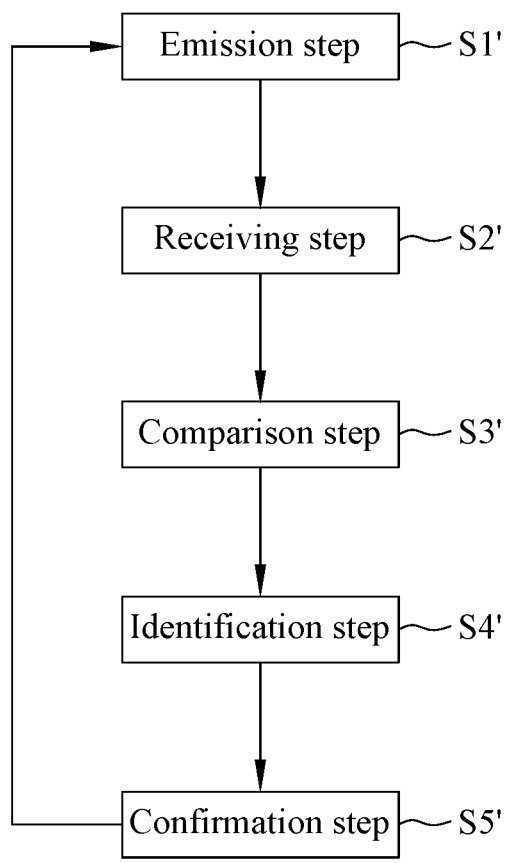
FIG. 8 is a flowchart illustrating the steps of identification method of the fingerprint recognition system according to the second embodiment of the present invention.

Referring to FIG. 7 and FIG. 8, FIG. 7 is a schematic view of recognition of the fingerprint recognition system according to the second embodiment of the present invention; FIG. 8 is a flowchart illustrating the steps of identification method of the fingerprint recognition system according to the second embodiment of the present invention. Based on the second embodiment of the fingerprint identification system 100, the present invention further provides an identification method of the fingerprint identification system 100, comprising the following steps:

Emission step S1': the at least one light emitter 20 emitting the at least one patterned emitted light r1 to the object 200 under test; then proceed to receiving step S2'.

Receiving step S2': the at least one light receiver 30 receiving the at least one patterned reflected light r1' reflected by the object 200 under test; then proceed to comparison step S3'.

Comparison step S3': the comparison module 40 comparing the at least one patterned emitted light r1 and the at least one patterned reflected light r1', and generating comparison information; then proceed to identification step S4'.

Identification step S4': if the comparison information being in the three-dimensional comparison interval, the comparison module 40 determining the surface of the object 200 under test being three-dimensional; otherwise, the comparison module 40 determining the surface of the object 200 under test being planar, then proceed to confirmation step S5'.

Confirming step S5': when the fingerprint recognition system 100 determines that the object 200 is planar, the actuator 50 moves the light emitter 20 to change the incident angle and adjusts the emitted light r1 to emitted light r2, so that the incident angle θ1 is changed to the incident angle θ2, and the patterned reflected light r1' becomes the patterned reflected light r2'; and then, the emission step S1', the receiving step S2', the comparison step S3', and the identification Step S4' are performed again. The method and principle are the same as those described above, and the description will not be repeated here.

For example, referring to FIG. 7, as well as FIGS. 5-8, in the emission step S1', the light emitter 20 emits patterned emitted light r1 to the object 203 under test. Then, in the receiving step S2', the light receiver 30 receives the patterned reflected light r1' reflected by the object 203. In the comparison step S3', the comparison module 40 is used to compare the patterned emitted light r1 with the patterned reflected lights r1' to generate the comparison information; and finally, in the identification step S4', the object 203 are identified by the comparison module 40. When the comparison information is in the three-dimensional comparison interval, the comparison module 40 determines that the surface of the object is three-dimensional; otherwise, the comparison module 40 determines that the surface of the object is a flat surface.

Furthermore, in the confirmation step S5', when the fingerprint recognition system 100 determines that the surface of the test object 203 is planar, the actuator 50 moving the light emitter 20 to change the patterned emitted light r1 to patterned emitted light r2, causing the incident angle to change from θ1 to θ2, and the reflection angle from θ1' to θ2', and repeat the sequence of emission step S1', receiving step S2', comparison step S3', and identification step S4', its method and principle are the same as those described above, and will not be repeated here.

It should be further explained that, as shown in FIG. 7, when the comparison module 40 compares the patterned emitted light r1 with the patterned reflected light r1', the incident direction of the patterned emitted light r1 may be parallel to the three-dimensional portion of the object 203, so that the comparison between the patterned emitted light r1 and the patterned reflected light r1' shows no obvious pattern difference. Therefore, in the confirmation step S5', the actuator 50 moves the light emitter 20 to change the patterned emitted light r1 to the patterned emitted light r2, causing the incident angle to change from θ1 to θ2, and the reflection angle from θ1' to θ2'. As such, the incident direction of the patterned emitted light r2 and the three-dimensional portion of the object 203 are no longer parallel to each other. Therefore, the comparison between the patterned emitted light r2 and the patterned reflected light r2' will show a significant pattern difference, so that the fingerprint recognition system 100 of the present invention can correctly determine the object 203 to be three-dimensional.

Thus, the second embodiment of the fingerprint recognition system 100 of the present invention uses the actuator 50 to change the patterned emitted light r1 emitted by the light emitter 20 to the patterned emitted light r2, so as to increase the variables and data volume when the comparison module 40 performs comparison, which improves the accuracy of the fingerprint recognition system 100, but also increases the cost and system recognition time. Therefore, the characteristics and cost requirements of the fingerprint recognition system 100 may be taken into consideration depending on the application needs.

It is worth noting that although the above description is based on the movement of the actuator 50 to change the incident angle to increase the amount of variables and data of the comparison module 40, the present invention is not limited to thereto. Other means, such as wavelength, the pattern and the emission frequency of the patterned emitted light, can also be used as variables in the comparison of the fingerprint recognition system 100. Using these changes, the comparison showing no obvious pattern difference between the patterned emitted light and the patterned reflected light in one case may show obvious difference in another. Therefore, the accuracy of determining whether the object 200 is three-dimensional is increased, thereby improving the accuracy of the fingerprint recognition system 100.

Figure 9:
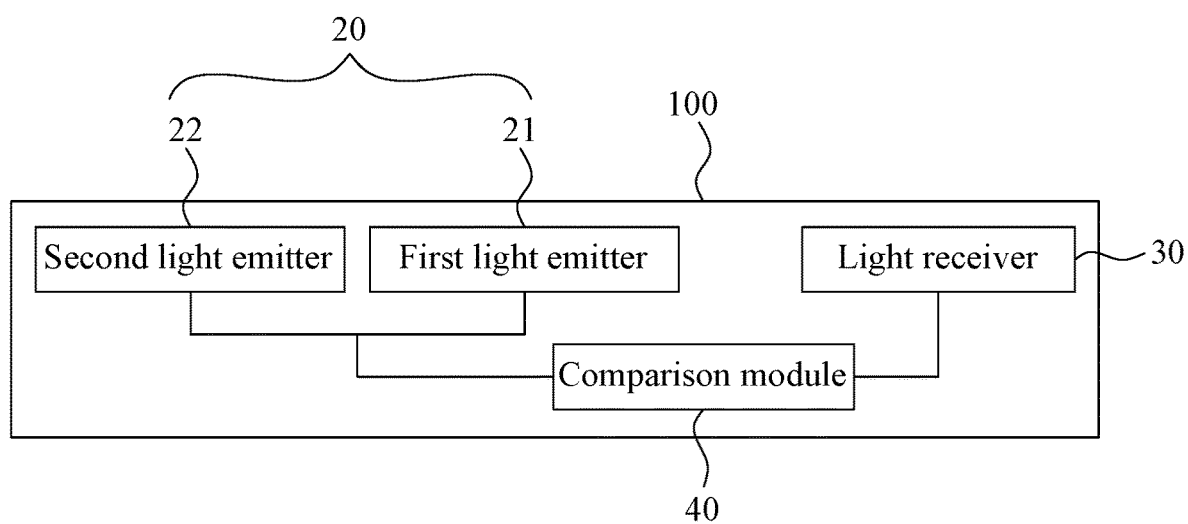
FIG. 9 is a schematic view of a fingerprint recognition system according to a third embodiment of the present invention.
Figure 10:
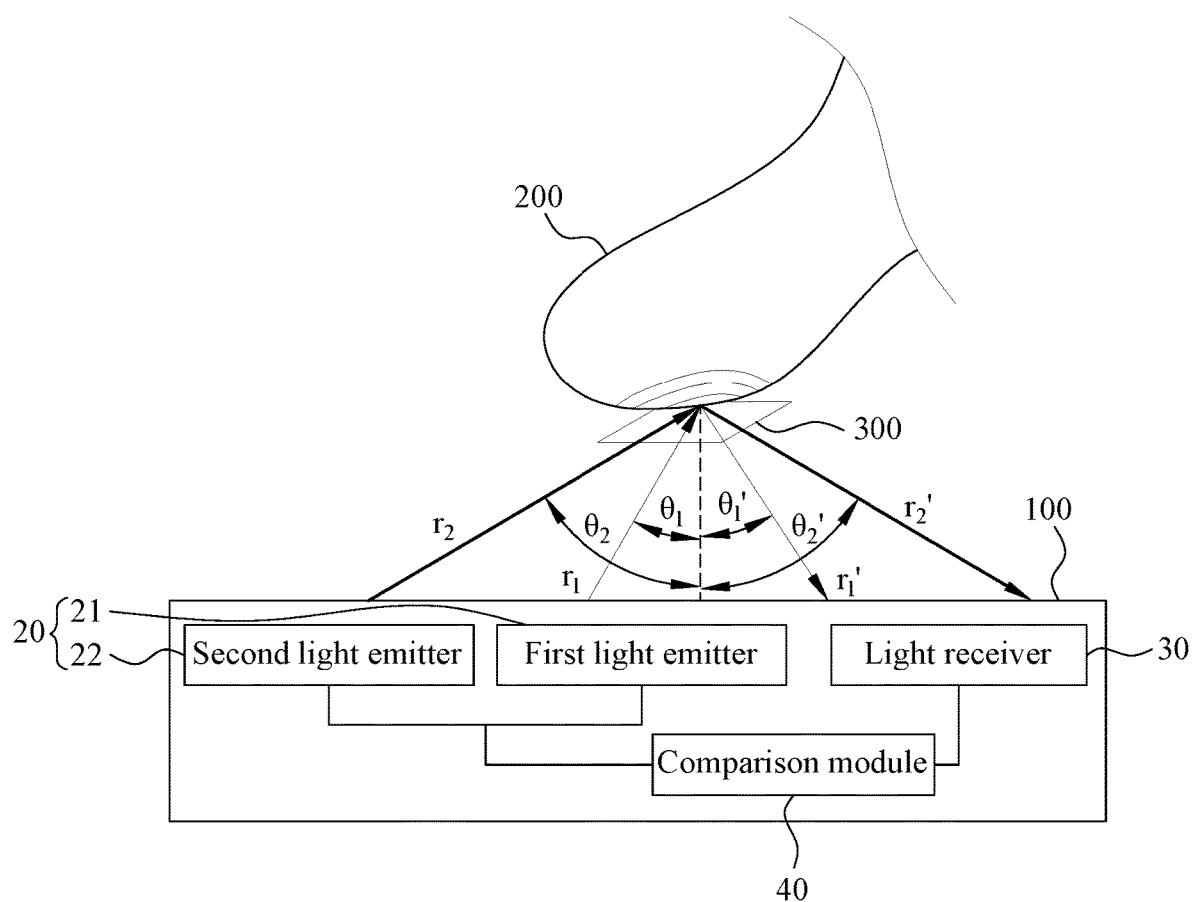
FIG. 10 is a schematic view of the disposition location of the fingerprint recognition system according to the third embodiment of the present invention.

Referring to FIG. 9 and FIG. 10, FIG. 9 is a schematic view of a fingerprint recognition system according to a third embodiment of the present invention; FIG. 10 is a schematic view of the disposition location of the fingerprint recognition system according to the third embodiment of the present invention. Compared with the first embodiment and the second embodiment, the main structural difference of the third embodiment is that the fingerprint recognition system 100 has a plurality of light emitters 20. In the present embodiment, the light emitters 20 include a first light emitter 21 and a second light emitter 22, the first light emitter 21 and the second light emitter 22 respectively emit at least one patterned emitted light r to the object 200 in the recognition area 300, wherein the first light emitter 21 emits the patterned emitted light r1, and the second light emitter 22 emits the patterned emitted light r2, thereby changing the incident angle of the patterned emitted light r, causing the incident angle to change to θ1 and θ2, and the reflection angle to θ1' and θ2'.

It should be further explained that, in the present embodiment, the fingerprint recognition system 100 is applied to a smart phone, so the screen of the smart phone can be used as the light emitter 20. The screen of the smart phone includes a plurality of light-emitting areas. In other words, any two light-emitting areas can be easily used as the first light emitter 21 and the second light emitter 22, without the need to additionally provide the first light emitter 21 and the second light emitter 22. However, the present invention is not limited to thereto.

As such, the third embodiment not only achieves the effects of the first and second embodiments, but also provides a different structure that does not require the actuator 50, thus achieving the objectives of low cost and reduction of the space occupied by the fingerprint recognition system 100. Moreover, the third embodiment can effectively solve the aforementioned special case wherein the incident direction of the patterned emitted light r1 is parallel to the three-dimensional portion of the object 200, and the comparison between the patterned emitted light r1 and the patterned reflected light r1' shows no obvious pattern deformation, so that the comparison module 40 may judge the three-dimensional object 200 to be planar and the user is unable to unlock the fingerprint recognition system.

Specifically, the patterned emitted light r1 and the patterned emitted light r2 emitted by the first light emitter 21 and the second light emitter 22 can be selected from one or a combination of moving, rotating, zooming in, zooming out, flickering, and non-flickering modes, but the present invention is not limited to this.

Specifically, the patterned emitted light r1 and the patterned emitted light r2 emitted by the first light emitter 21 and the second light emitter 22 may be one or a combination of a point emitted light, a stripe emitted light, a grid line emitted light, a closed curve emitted light, an open curve emitted light, and an irregular pattern emitted light, but the present invention is not limited thereto.

Specifically, in the present embodiment, the patterned emitted light r1 and the patterned emitted light r2 may have a pattern close to the spatial frequency of a real fingerprint. As a result, when the fingerprint recognition system 100 of the present invention is used for fingerprint recognition, it will be easier to determine whether the surface of the test object 200 is three-dimensional, but the present invention is not limited to thereto.

Figure 11:
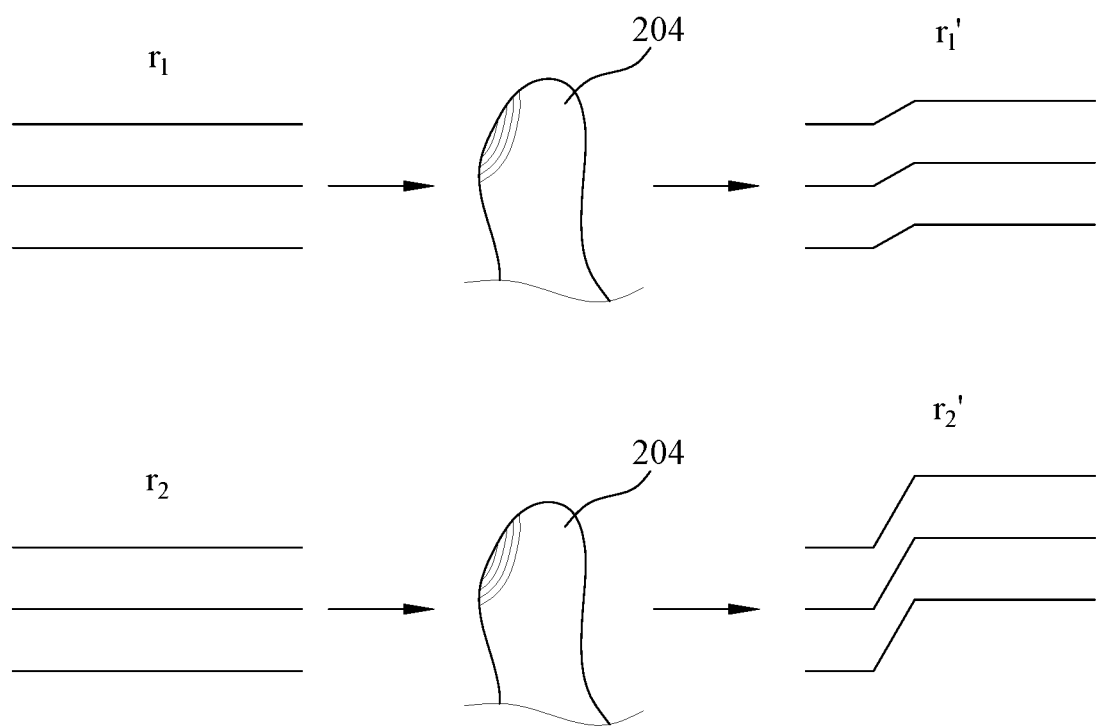
FIG. 11 is a schematic view of recognition of the fingerprint recognition system according to the third embodiment of the present invention.
Figure 12:
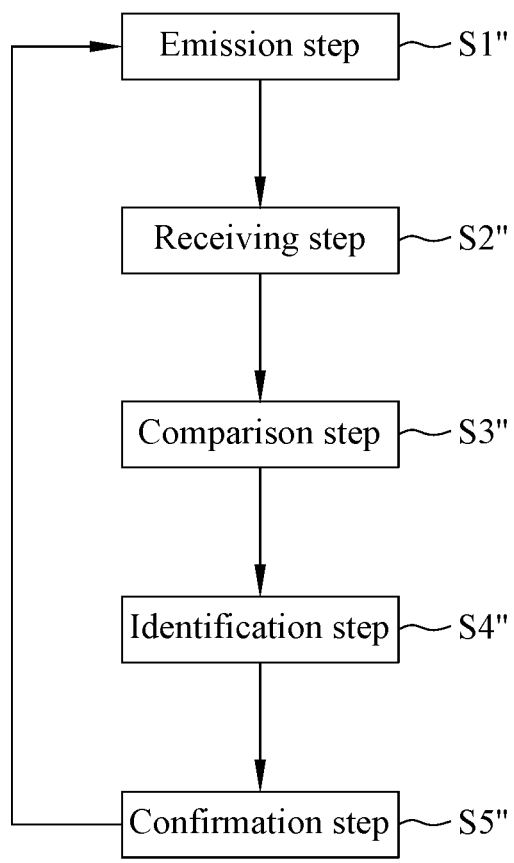
FIG. 12 is a flowchart illustrating the steps of identification method of the fingerprint recognition system according to the third embodiment of the present invention.

Referring to FIG. 12, as well as FIG. 11, FIG. 11 is a schematic view of recognition of the fingerprint recognition system according to the third embodiment of the present invention; FIG. 12 is a flowchart illustrating the steps of identification method of the fingerprint recognition system according to the third embodiment of the present invention. Based on the third embodiment of the fingerprint recognition system 100, the present invention further provides an identification method of the fingerprint recognition system 100, comprising the following steps:

Emission step S1": activating the first light emitter 21 to emit the at least one patterned emitted light r1 to the object 204 under test; then proceed to receiving step S2".

Receiving step S2": the at least one light receiver 30 receiving the at least one patterned reflected light r1' reflected by the object 204 under test; then proceed to comparison step S3".

Comparison step S3": the comparison module 40 comparing the at least one patterned emitted light r1 and the at least one patterned reflected light r1', and generating comparison information; then proceed to identification step S4".

Identification step S4": if the comparison information being in the three-dimensional comparison interval, the comparison module 40 determining the surface of the object 204 under test being three-dimensional; otherwise, the comparison module 40 determining the surface of the object 204 under test being planar, then proceed to confirmation step S5".

Confirming step S5": when the fingerprint recognition system 100 determines that the object 204 is planar, activating the second light emitter 22 to change the incident angle and adjusts the emitted light r1 to emitted light r2, so that the incident angle θ1 is changed to the incident angle θ2, and the patterned reflected light r1' becomes the patterned reflected light r2'; and then, the emission step S1", the receiving step S2", the comparison step S3", and the identification Step S4" are performed again. The method and principle are the same as those described above, and the description will not be repeated here.

For example, referring to FIG. 11, as well as FIGS. 9-12, in the emission step S1", the first light emitter 21 emits patterned emitted light r1 to the object 204 under test. Then, in the receiving step S2", the light receiver 30 receives the patterned reflected light r1' reflected by the object 204. In the comparison step S3", the comparison module 40 is used to compare the patterned emitted light r1 with the patterned reflected lights r1' to generate the comparison information; and finally, in the identification step S4", the object 204 is identified by the comparison module 40. When the comparison information is in the three-dimensional comparison interval, the comparison module 40 determines that the surface of the object 204 is three-dimensional; otherwise, the comparison module 40 determines that the surface of the object 204 is a flat surface.

Furthermore, in the confirmation step S5", when the fingerprint recognition system 100 determines that the surface of the test object 204 is planar, the second light emitter 20 is activated to change the patterned emitted light r1 to patterned emitted light r2, causing the incident angle to change from θ1 to θ2, and the reflection angle from θ1' to θ2', and repeat the sequence of emission step S1″, receiving step S2″, comparison step S3″, and identification step S4″, its method and principle are the same as those described above, and will not be repeated here.

It should be noted that the above description is based on the first light emitter 21 and the second light emitter 22 to change the patterned emitted light r1 emitted to the patterned emitted light r2, but the present invention is not limited to thereto. The fingerprint recognition system 100 can also comprise a plurality of light receivers 30, whereby the reflection angle is changed from θ1' to θ2' without changing the incident angle. The changing of the reflection angle makes the fingerprint recognition system 100 of the present invention generating more variables and data volume to improve the accuracy of determining whether the surface of the test object 200 is three-dimensional, which however also increases the cost and system recognition time. The method and principle are the same as those described above, and the description will not be repeated here. Therefore, the characteristics and cost requirements of the fingerprint recognition system 100 may be taken into consideration depending on the application needs.

It is worth noting that although the above description is based on the first light emitter 21 and the second light emitter 22 to change the incident angle to increase the amount of variables and data of the comparison module 40, the present invention is not limited to thereto. Other means, such as wavelength, the pattern and the emission frequency of the patterned emitted light, can also be used as variables in the comparison of the fingerprint recognition system 100. Using these changes, the comparison showing no obvious pattern difference between the patterned emitted light and the patterned reflected light in one case may show obvious difference in another. Therefore, the accuracy of determining whether the object 200 is three-dimensional is increased, thereby improving the accuracy of the fingerprint recognition system 100.

Figure 13:
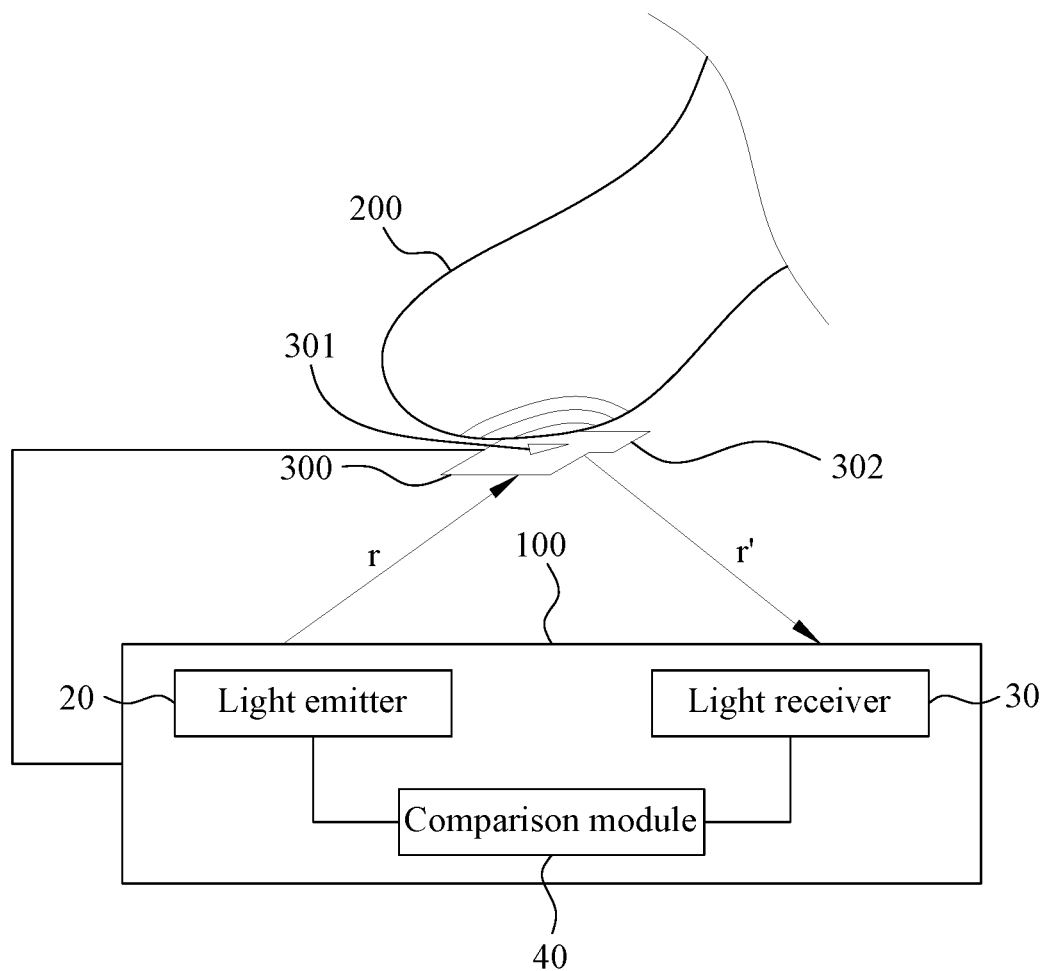
FIG. 13 is a schematic view of the architecture of the fingerprint recognition system according to a fourth embodiment of the present invention.
Figure 14:
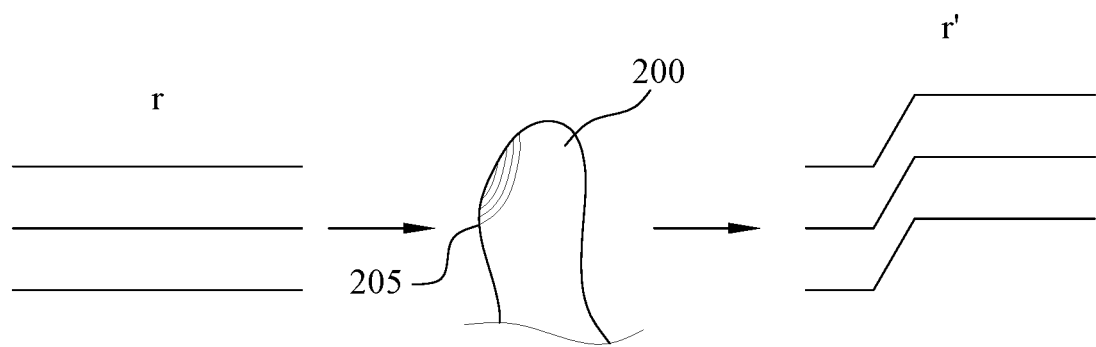
FIG. 14 is a schematic view of recognition of the fingerprint recognition system according to the fourth embodiment of the present invention.
Figure 15:
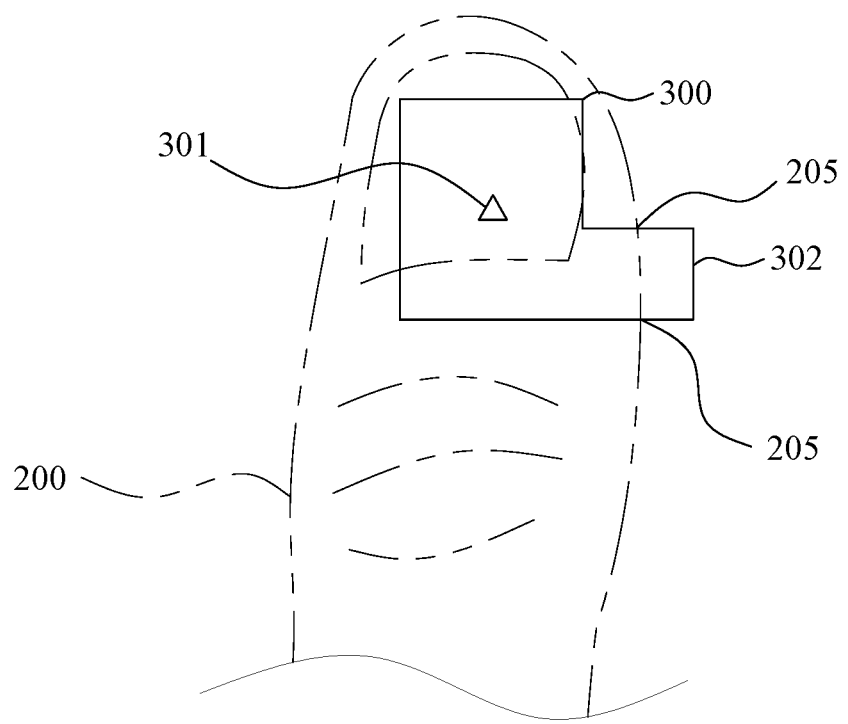
FIG. 15 is a schematic view illustrating the object under test attached to the recognition area according to the fourth embodiment of the present invention.

Referring to FIGS. 13-15, FIG. 13 is a schematic view of the architecture of the fingerprint recognition system according to a fourth embodiment of the present invention; FIG. 14 is a schematic view of recognition of the fingerprint recognition system according to the fourth embodiment of the present invention. Compared with the aforementioned embodiments, the main structural difference of the fourth embodiment is that the recognition area 300 further includes a prompt symbol 301, which is electrically connected to the fingerprint recognition system 100, and the shape of the recognition area 300 is disposed with a protrusion 302. In the present embodiment, the recognition area 300 uses the prompt symbol 301 to indicate the location where the test object 200 is to press on. Moreover, the protrusion 302 ensures that at least a portion of the edge 205 of the object 200 is located within the recognition area. Then, the light emitter 20 is activated to emit at least one patterned emitted light r to the object 200 in the recognition area 300

Moreover, in the present embodiment, the patterned emitted light r emitted by the light emitter 20 has a pattern (not shown) that is significantly smaller than the spatial frequency of the real fingerprint. Because the spatial frequency of the real fingerprint is higher, the patterned emitted light r of the fourth embodiment of the present invention has a pattern that is significantly smaller than the spatial frequency of the real fingerprint. Therefore, the patterned reflected light r' of the fourth embodiment of the present invention will have both a high spatial frequency pattern and a low spatial frequency pattern. Wherein, the pattern with high spatial frequency can be used for identity recognition of the fingerprint, and the pattern with low spatial frequency can be used for three-dimensional judgment on the fingerprint. As such, the fourth embodiment of the fingerprint recognition system 100 of the present invention can simultaneously perform the functions of recognizing the identity of the fingerprint and the three-dimensional judgment of the fingerprint, which greatly increases the applicability of the fingerprint recognition system 100 of the present invention.

Referring to FIG. 15, FIG. 15 is a schematic view illustrating the object under test attached to the recognition area according to the fourth embodiment of the present invention. It should be further explained that currently the conventional fingerprint recognition area generally has a smaller area than that of an adult finger, so that when the user uses the fingerprint recognition system, the user's finger will completely fit into the recognition area. However, in the fourth embodiment of the present invention, for example, the fingerprint recognition system 100 provides the shape of the recognition area 300 with a protrusion 302 to ensure that when the user uses the fingerprint recognition system 100, at least a portion of the edge 205 of the test object 200 must fall into the recognition area 300. As such, the object 200 has at least one edge 205 inside the recognition area 300, and the three-dimensionality of at least a portion of the edge 205 of the object 200 is relatively obvious to the fingerprint. Therefore, the fingerprint recognition system 100 of the present invention can easily and accurately recognize whether the surface of the object 200 is three-dimensional. Thereby, the fourth embodiment not only achieves the effects of the aforementioned embodiments, but also greatly increases the recognition accuracy when compared with the aforementioned embodiments, by further configuring the shape of the recognition area 300 to include a protrusion 302 to ensure that at least a portion of the edge 250 of the object 200 is positioned within the recognition 300. The light emitter 20 is activated to emit at least one patterned emitted light r on the object 200 to increase the discerning ability of the comparison module 40 to perform the comparison between the patterned emitted light r and the reflected light r', which greatly increases the recognition accuracy of the fingerprint recognition system 100 of the present invention.

Figure 16A:
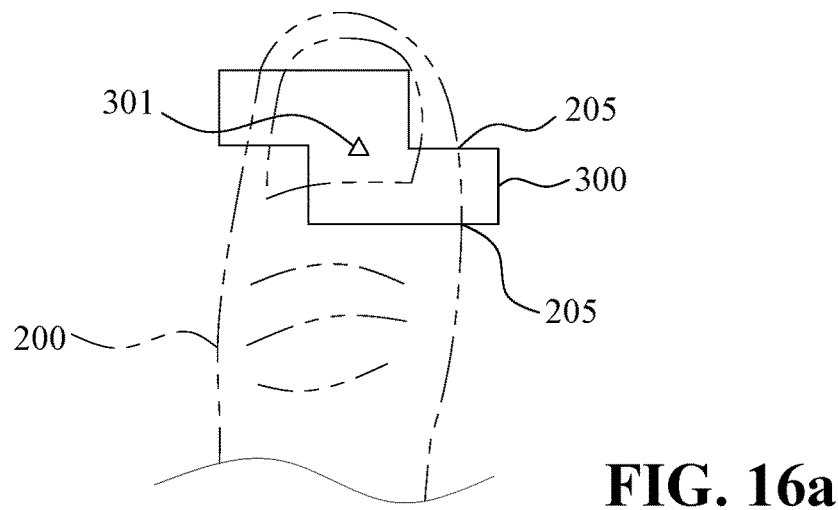
FIG. 16a is a schematic view illustrating another implementation of the identification area of the recognition area according to the fourth embodiment of the present invention.
Figure 16B:
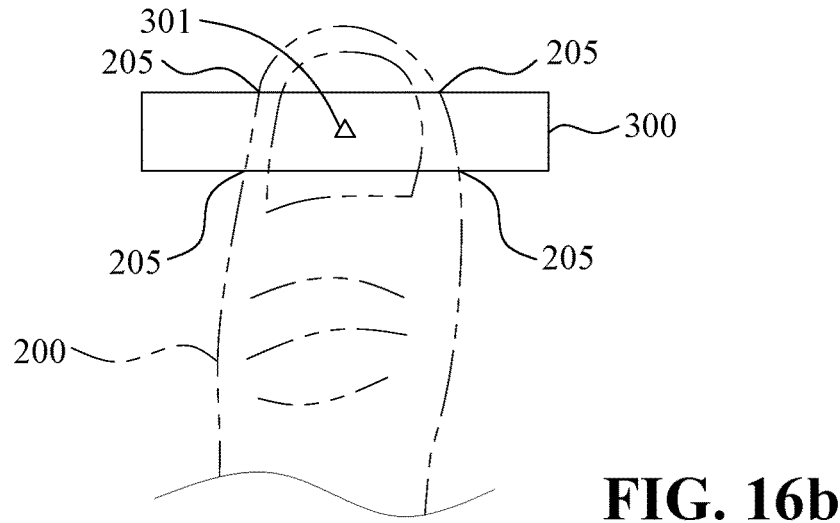
FIG. 16b is a schematic view illustrating yet another implementation of the identification area of the recognition area according to the fourth embodiment of the present invention.
Figure 16C:
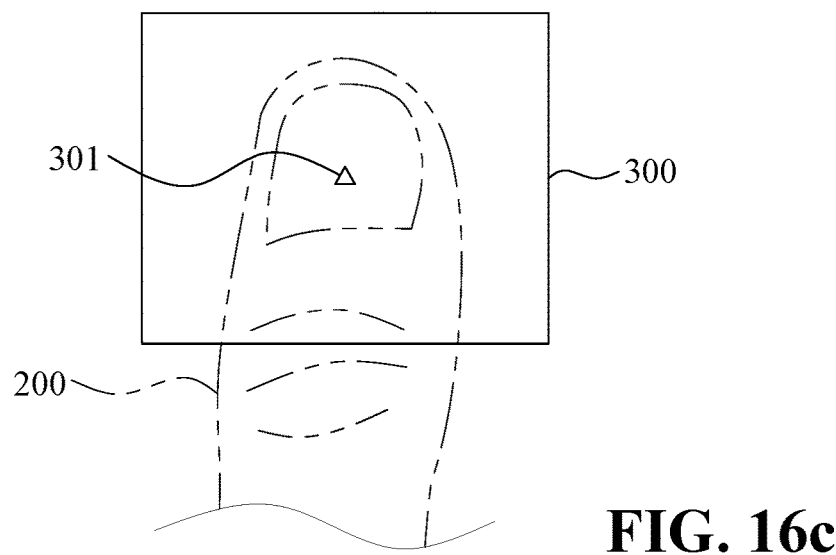
FIG. 16c is a schematic view illustrating yet another implementation of the identification area of the recognition area according to the fourth embodiment of the present invention.

It is worth noting that although the above description is based on providing the shape of the recognition area 300 with a protrusion 302, the present invention should not be construed as being limited to the above. Referring to FIG. 16a, FIG. 16a is a schematic view illustrating another implementation of the identification area of the recognition area according to the fourth embodiment of the present invention. The shape of the recognition area 300 may also include a plurality of protrusions, or any shape, such as one of a triangle, a rhombus, a circle, and an irregular shape, or a combination thereof, that can ensure that at least a portion of the edge 205 of the object 200 falls into inside the recognition area 300. Alternatively, referring to FIG. 16b, FIG. 16b is a schematic view illustrating yet another implementation of the identification area of the recognition area according to the fourth embodiment of the present invention. Since the technical feature of the present invention is to use the three-dimensionality of the test object 200 to perform identification of real fingerprints, therefore, the shape of the recognition area 300 can have a length and a width with a big difference. In other words, since the fingerprint recognition system 100 of the present invention does not need complete fingerprint information to perform distinguishing a real fingerprint from a planar image of a fingerprint, therefore, the shape of the recognition area 300 may have an extreme aspect ratio to ensure that at least a portion of the edge 205 of the object 200 under test falls within the recognition area 300. Moreover, referring to FIG. 16c, FIG. 16c is a schematic view illustrating yet another implementation of the identification area of the recognition area according to the fourth embodiment of the present invention. In addition to providing the shape of the recognition area 300 with a protrusion 302, the recognition area 300 may also be enlarged. By providing the recognition area 300 of a larger area than the average size of an adult finger, it can be ensured that at least a portion of the edge 205 of the test object 200 falls within the recognition area 300, thereby increasing the possibility of the comparison between the patterned emitted light r and the patterned reflected light r' to show obvious pattern difference, which greatly increases the recognition accuracy of the fingerprint recognition system 100 of the present invention.

Figure 17:
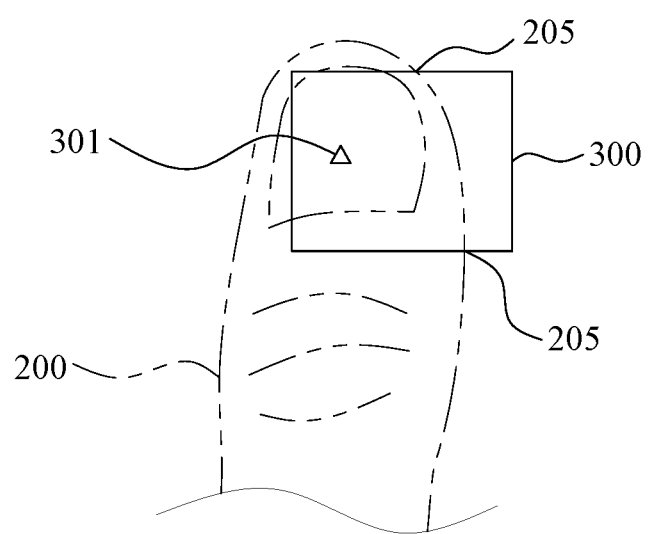
FIG. 17 is a schematic view illustrating the position of the prompt symbol of the fingerprint recognition system according to the fourth embodiment of the present invention.

Referring to FIG. 17, FIG. 17 is a schematic view illustrating the position of the prompt symbol of the fingerprint recognition system according to the fourth embodiment of the present invention. In the fourth embodiment of the fingerprint recognition system 100 of the present invention, the prompt symbol 301 can be arranged close to the edge of the recognition area 300, so that the test object 200 will be close to the edge of the recognition area 300 when pressed, so as to ensure at least a portion of the edge 205 of the test object 200 falls into the recognition area 300 to increase the pattern difference when the comparison module 40 compares the patterned emitted light r and the patterned reflected light r', which also increases the recognition accuracy of the fingerprint recognition system 100 of the present invention. However, although it is relatively easy to place the prompt symbol 301 near the edge of the recognition area 300, the fingerprint recognition system 100 may not be able to correctly identifying the object 200 due to the off-center placement of the object 200 in the recognition area 300 due to prompt symbol 301, which may cause inconvenience.

Specifically, the patterned emitted light r emitted by the light emitter 20 may be selected from one or a combination of moving, rotating, zooming in, zooming out, flickering, and non-flickering modes, but the present invention is not limited to this.

Specifically, the patterned emitted light r emitted by the light emitter 20 may be one or a combination of a point emitted light, a stripe emitted light, a grid line emitted light, a closed curve emitted light, an open curve emitted light, and an irregular pattern emitted light, but the present invention is not limited thereto.

Specifically, in the present embodiment, the patterned emitted light r may have a pattern close to the spatial frequency of a real fingerprint. As a result, when the fingerprint recognition system 100 of the present invention is used for fingerprint recognition, it will be easier to determine whether the surface of the test object 200 is three-dimensional, but the present invention is not limited to thereto.

Figure 18:
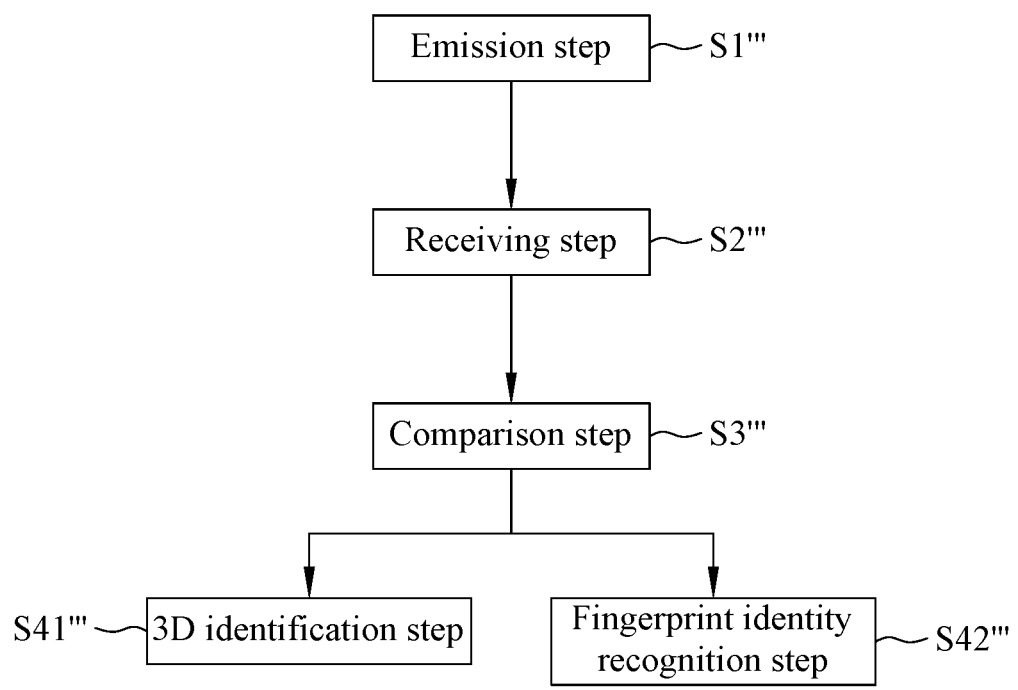
FIG. 18 is a flowchart illustrating the steps of identification method of the fingerprint recognition system according to the fourth embodiment of the present invention.

Referring to FIG. 18, FIG. 18 is a flowchart illustrating the steps of identification method of the fingerprint recognition system according to the fourth embodiment of the present invention. Based on the fourth embodiment of the fingerprint recognition system 100, the present invention further provides an identification method for the fingerprint recognition system 100, comprising the following steps:

Emission step S1''': the at least one light emitter 20 emitting the at least one patterned emitted light r to the object 200 under test, the patterned emitted light r emitted by the light emitter 20 having a pattern significantly smaller than spatial frequency of a real fingerprint; then proceed to receiving step S2'''.

Receiving step S2''': the at least one light receiver 30 receiving the at least one patterned reflected light r' reflected by the object 200 under test; then proceed to comparison step S3'''.

Comparison step S3''': the comparison module 40 comparing the patterns with low spatial frequency in the at least one patterned emitted light r and the at least one patterned reflected light r', and generating comparison information; then proceed to identification step S41'''.

Three-dimensionality identification step S41''': if the comparison information being in the three-dimensional comparison interval, the comparison module 40 determining the surface of the object 200 under test being three-dimensional; otherwise, the comparison module 40 determining the surface of the object 200 under test being planar.

Fingerprint identity recognition step S42'': performing identity recognition of the fingerprint by examining the pattern with high spatial frequency in the patterned reflected light r'.

For example, referring to FIG. 14 as well as FIGS. 13-16, in the emission step S1''', the light emitter 20 respectively emits the patterned emitted light r respectively to the object 200 under test, wherein the patterned emitted light r emitted by the light emitter 20 has a pattern significantly smaller than spatial frequency of a real fingerprint. Then, in the receiving step S2''', the light receiver 30 receives the patterned reflected light r' reflected by the object 200. In the comparison step S3''', the comparison module 40 is used to compare the patterns with low spatial frequency in the patterned emitted light r with the patterned reflected lights r' to generate the comparison information; and in the identification step S41''', the object 200 is identified by the comparison module 40. When the comparison information is in the three-dimensional comparison interval, the comparison module 40 determines that the surface of the object is three-dimensional; otherwise, the comparison module 40 determines that the surface of the object is a flat surface. Finally, in the fingerprint identity recognition step S42''', the identity recognition of the fingerprint is performed by examining the pattern with high spatial frequency in the patterned reflected light r'.

As such, the fourth embodiment of the fingerprint recognition system 100 of the present invention uses the protrusion 302 to ensure that at least a portion of the edge 205 of the test object 200 falls within the recognition area 300 to increase the probability of showing pattern deformation after the comparison module 40 compares the patterned emitted light r1 and the patterned reflected light r1', which greatly increases the three-dimensionality recognition accuracy of the fingerprint recognition system 100 of the present invention. Moreover, the patterned emitted light r in the fourth embodiment of the present invention has a pattern that is significantly smaller than the spatial frequency of a real fingerprint, so that after the patterned emitted light r in the fourth embodiment of the present invention is emitted to the object 200, the reflected light r' comprises both a high spatial frequency pattern and a low spatial frequency pattern. The high spatial frequency pattern can be used for recognizing the identity of the fingerprint. As such, the fourth embodiment of the fingerprint recognition system 100 of the present invention can simultaneously perform the functions of fingerprint identity recognition and fingerprint three-dimensional judgment, which greatly increases the applicability of the fingerprint recognition system 100 of the present invention.

Accordingly, the present invention has the following effects:

1. Based on the fingerprint recognition system 100, combined with the identification method provided by the present invention, the present invention can determine whether the test object 200 is three-dimensional, effectively preventing others from cracking the fingerprint recognition system with fingerprint photos or pictures, which greatly increase the security and recognition capabilities of the fingerprint recognition system.

2. The present invention uses the actuator 50 to move the light emitter 20 to change the patterned emitted light r1 emitted into the patterned emitted light r2, resulting in the incident angle being changed from θ1 to θ2 to increase the variables and data volume generated by the comparison module 40 during the comparison, which effectively improves the accuracy of the fingerprint recognition system 100.

3. Each component in the fingerprint recognition system 100 of the present invention is a necessary component in the fingerprint recognition system, so there is no need to add any additional components; hence, the present invention provides the advantages of high applicability and low cost.

4. In a preferred embodiment of the present invention, by providing the first light emitter 21 and the second light emitter 22, the at least one light emitter 20 can change the patterned emission light r1 to the patterned emission light r2 without the actuator 50, which lowers the cost and reduces space occupied by the fingerprint recognition system 100.

5. According to the fingerprint identification system 100 of the present invention, the patterned emitted light r may be one or a combination of a point emitted light, a stripe emitted light, a grid line emitted light, a closed curve emitted light, an open curve emitted light, and an irregular pattern emitted light, and the patterned emitted light r emitted by the light emitter 20 may be selected from one or a combination of moving, rotating, zooming in, zooming out, flickering, and non-flickering modes, which increases the variables and the amount of data of the fingerprint recognition system 100 of the present invention to improve the accuracy of judgment.

6. The fingerprint recognition system 100 according to the present invention further adjusts the wavelength, the pattern of the patterned emitted light, and the emission frequency, etc., and uses these changes to increase the accuracy of the comparison module 40 in judging whether the surface of the object 200 under test is three-dimensional or not, thereby improving the accuracy of the fingerprint recognition system 100.

7. The present invention uses the protrusion 302 of the recognition area 300 to ensure that at least a portion of the edge 205 of the object 200 under test falls within the recognition area 300, so as to increase the pattern difference when the comparison module 40 comparing the at least one patterned emitted light r1 and the patterned reflected light r1', to increase the recognition accuracy of the fingerprint recognition system 100 of the present invention.

8. According to the fingerprint identification system 100 of the present invention, by setting the patterned emitted light r to have a pattern with a spatial frequency significantly smaller than that of a real fingerprint, the reflected light r' simultaneously comprises a pattern with a high spatial frequency and a pattern with a low spatial frequency. The high spatial frequency pattern can be used for recognizing the identity of the fingerprint. As a result, the fingerprint recognition system 100 of the present invention can simultaneously perform the functions of fingerprint identity recognition and fingerprint three-dimensional judgment, which greatly increases the applicability of the fingerprint recognition system 100 of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fingerprint recognition system, applicable to determining a real fingerprint, comprising:
    at least one light emitter, emitting at least one patterned emitted light onto at least an object under test in a recognition area;
    at least one light receiver, electrically connected to the light emitter, for receiving at least one patterned reflected light reflected by the object under test, wherein an incident angle existing between the object under test and the patterned emitted light and a plurality of reflection angles existing between the object under test and the patterned reflected light, and the incident angle and the reflection angle being all between 0 degrees and 90 degrees; and
    a comparison module, electrically connected to the light emitter and the light receiver, for comparing the at least one patterned emitted light and the at least one patterned reflected light with each other, and generating a comparison information;
    wherein, when the comparison information is in a three-dimensional comparison interval, the comparison module determining that the object under test having a three-dimensional surface; otherwise, the comparison module determining that the object under test having a planar surface; the three-dimensional comparison interval being used as a reference value for judging whether the surface of the object under test is three-dimensional, and the patterned emitted light being selected from one or a combination of moving, rotating, zooming in, zooming out, flickering, and non-flickering modes.

2. The fingerprint recognition system according to claim 1, wherein the at least one patterned emitted light is one or a combination of a point emitted light, a stripe emitted light, a grid emitted light, a closed curve emitted light, an open curve emitted light and irregular light.

3. The fingerprint recognition system according to claim 1, wherein the recognition area does not perpendicular to the light emitter and the light receiver simultaneously.

4. The fingerprint recognition system according to claim 1, wherein the fingerprint recognition system comprises a plurality of light emitters, and at least two of the light emitters respectively emit at least one patterned emitted light to the object under test for the different incident angles of the patterned emitted lights.

5. The fingerprint recognition system according to claim 1, wherein the fingerprint recognition system comprises a plurality of light receivers, and at least two of the light receivers respectively receive the patterned reflected light for different reflection angles of the patterned reflected lights.

6. The fingerprint recognition system according to claim 1, wherein the at least one patterned emitted light has a pattern close to the spatial frequency of the fingerprint.

7. The fingerprint recognition system according to claim 1, wherein the at least one patterned emitted light has a pattern smaller than the spatial frequency of the fingerprint.

8. The fingerprint recognition system according to claim 1, wherein the wavelength of the at least one patterned emitted light is not a fixed value.

9. The fingerprint recognition system according to claim 1, wherein the light emitter emits the patterned emitted light at an emission frequency that is not a fixed value.

10. The fingerprint recognition system according to claim 1, wherein the wavelength of the at least one patterned emitted light emitted by the light emitter is between 360 nm and 1350 nm.

11. The fingerprint recognition system according to claim 1, wherein the wavelength of the at least one patterned emitted light emitted by the light emitter is between 360 nm and 860 nm.

12. The fingerprint recognition system according to claim 1, wherein the reflection angle is not 0 degree.

13. The fingerprint recognition system according to claim 1, further comprising an actuator, movably coupled to the light emitter, for changing the incident angle of the at least one patterned emitted light.

14. The fingerprint recognition system according to claim 1, wherein the recognition area further comprises a prompt symbol, the prompt symbol is electrically connected to the fingerprint recognition system, and the prompt symbol is used to indicate the position for the object under test to press on.

15. The fingerprint recognition system according to claim 1, wherein the recognition area has a shape comprising a protrusion, and the protrusion is used to make at least a portion of an edge of the object under test inside the recognition area.

16. The fingerprint recognition system according to claim 14, wherein the prompt symbol is arranged near the edge of the recognition area.

17. An identification method, applicable to the fingerprint recognition system according to claim 1, comprising:
   an emission step: the at least one light emitter emitting the at least one patterned emitted light to the object under test in the recognition area;
   a receiving step: the at least one light receiver receiving the at least one patterned reflected light reflected by the object under test in the recognition area;
   a comparison step: the comparison module comparing the at least one patterned emitted light and the at least one patterned reflected light are compared with each other, and generating comparison information; and
   an identification step: if the comparison information being in the three-dimensional comparison interval, the surface of the object under test being three-dimensional; otherwise, the surface of the object under test being planar.

18. The identification method according to claim 17, further comprising a confirmation step: after performing the identification step, if the fingerprint recognition system determining that the object under test has a planar surface, another light emitter emitting at least one patterned emitted light to the object under with a different incident angles of the patterned emitted light, and then the steps of emission, receiving, comparison, and identification are repeated.

19. The identification method according to claim 17, further comprising a confirmation step: after performing the identification step performed, if the fingerprint recognition system determining that the object under test has a planar surface, another light receiver receiving the patterned reflected light reflected by the object under test with a different reflection angle for receiving the patterned reflected light, and then the steps of emission, receiving, comparison, and identification are repeated.

20. The identification method according to claim 17, further comprising a confirmation step: after performing the identification step performed, if the fingerprint recognition system determining that the object under test has a planar surface, the light emitter emitting another patterned emitted light to the object under test with a different or a combination mode of moving, rotating, zooming in, zooming out, flickering, and non-flickering modes, and then the steps of emission, receiving, comparison, and identification are repeated.

21. The identification method according to claim 17, wherein the identification step further comprises:
   a three-dimensional identification step: the light comparison module identifying the object under test having a three-dimensional surface if the comparison information being in the three-dimensional comparison interval; otherwise, the comparison module determining that the surface of the object under test being planar; and,
   a fingerprint identity recognition step: using a pattern having high spatial frequency of the patterned reflected light to perform fingerprint recognition on the object under test.

22. The identification method according to claim 17, wherein the at least one patterned emitted light has a pattern smaller than the spatial frequency of the fingerprint.

* * * * *